(12) United States Patent
Bickerstaff

(10) Patent No.: US 8,209,235 B2
(45) Date of Patent: Jun. 26, 2012

(54) METHOD AND APPARATUS FOR FACILITATING PEER-TO-PEER ELECTRONIC COMMERCE

(75) Inventor: Ryan M. Bickerstaff, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1152 days.

(21) Appl. No.: 11/606,495

(22) Filed: Nov. 29, 2006

(65) Prior Publication Data

US 2008/0126174 A1 May 29, 2008

(51) Int. Cl.
*G06Q 30/00* (2006.01)
(52) U.S. Cl. ............. 705/26.35; 705/26.1; 705/27.1
(58) Field of Classification Search .......... 705/26, 705/27, 26.1, 26.35, 27.1
See application file for complete search history.

(56) References Cited

U.S. PATENT DOCUMENTS

| | | | |
|---|---|---|---|
| 5,842,178 A * | 11/1998 | Giovannoli | 705/26 |
| 6,272,467 B1 * | 8/2001 | Durand et al. | 705/5 |
| 6,385,620 B1 * | 5/2002 | Kurzius et al. | 1/1 |
| 7,143,052 B2 * | 11/2006 | LaSalle et al. | 705/7 |
| 7,212,985 B2 * | 5/2007 | Sciuk | 705/7.33 |
| 7,464,051 B1 * | 12/2008 | Heggem | 705/26 |
| 7,502,748 B1 * | 3/2009 | Baldwin et al. | 705/9 |
| 7,805,382 B2 * | 9/2010 | Rosen et al. | 705/321 |
| 2003/0182171 A1 * | 9/2003 | Vianello | 705/9 |
| 2004/0148275 A1 * | 7/2004 | Achlioptas | 707/3 |
| 2007/0088652 A1 * | 4/2007 | Firmage et al. | 705/37 |

OTHER PUBLICATIONS

"Personalized location-based brokering using an agent-based intermediary architecture" by Guarav Tewari, Jim Youll, Pattie Maes, Decision Support Systems 34 (2002) 127-137.*

* cited by examiner

*Primary Examiner* — Jeffrey A Smith
*Assistant Examiner* — Anne Georgalas
(74) *Attorney, Agent, or Firm* — Park, Vaughan, Fleming & Dowler LLP

(57) ABSTRACT

One embodiment of the present invention provides a system for determining a list of providers of a commodity. During operation, the system receives a description of the commodity from a customer at a server. Then, the system uses the description to identify a list of providers of the commodity. Next, the system receives a specification of a set of desired provider-traits from the customer. The system then filters the list of providers of the commodity based on the desired provider-traits to obtain a filtered list of providers of the commodity. Finally, the system presents the filtered list of providers to the customer.

19 Claims, 5 Drawing Sheets

METHOD AND APPARATUS FOR FACILITATING PEER-TO-PEER ELECTRONIC COMMERCE

BACKGROUND

Related Art

The increasing popularity of the Internet has led to an increase in the number of users conducting commerce online. In response to this increase in electronic commerce, organizations have created a number of web-sites that provide a centralized "marketplace" for peer-to-peer electronic commerce.

Although convenient, peer-to-peer commerce web-sites rely significantly on users trusting one another. For example, a customer who purchases a commodity trusts that the provider of the commodity will send the commodity after receiving the customer's payment. Some peer-to-peer commerce web-sites employ strategies to reduce the level of trust required by customers who use these "safer" web-sites. However, to offset the costs involved in implementing these strategies, the "safer" web-sites typically charge commodity providers a fee for listing and selling commodities. Often, these fees discourage commodity providers from listing their commodities on the "safer" web-sites. Consequently, a customer who wants to use a peer-to-peer commerce web-site typically has to choose between obtaining a commodity from commodity providers who use "less-safe" free web-sites, or obtaining a commodity from a smaller number of commodity providers who use "safer" web-sites to sell commodities.

SUMMARY

One embodiment of the present invention provides a system for determining a list of providers of a commodity. During operation, the system receives a description of the commodity from a customer at a server. Then, the system uses the description to identify a list of providers of the commodity. Next, the system receives a specification of a set of desired provider-traits from the customer. The system then filters the list of providers of the commodity based on the desired provider-traits to obtain a filtered list of providers of the commodity. Finally, the system presents the filtered list of providers to the customer.

In a variation on this embodiment, the commodity can include a physical item, a piece of software, or a service.

In a variation on this embodiment, the provider-traits for a given provider can include: a group affiliation of the given provider; a hobby of the given provider; a degree of association with the customer; and a number of prior interactions with the customer.

In a variation on this embodiment, the desired provider-traits can include: required provider-traits, which the customer requires of a provider of the commodity; and preferred provider-traits, which the customer desires of the provider of the commodity, but does not require.

In a further variation, filtering the list of providers involves adding each provider who has the required provider-traits to the filtered list of providers. The system then sorts the filtered list of providers based on the preferred provider-traits associated with each provider.

In a variation on this embodiment, the system receives a set of customer-traits associated with the customer from the customer at the server.

In a further variation, filtering the list of providers of the commodity involves determining the set of customer-traits associated with the customer. Then, for each provider, the system determines a set of desired customer-traits, which the provider desires for customers who purchase the commodity. Next, the system determines if the set of desired customer-traits matches the set of customer-traits. If not, the system removes the provider from the list of providers of the commodity.

One embodiment of the present invention provides a system for selecting a customer of a commodity. During operation, the system receives at a server a set of preferred customer-traits from a provider of a commodity, wherein the set of preferred customer-traits are traits the provider desires of the customer of the commodity, but does not require. Then, the system retrieves customer-traits for potential customers of the commodity. Next, the system ranks the potential customers by comparing the customer-traits with the set of preferred customer-traits to obtain a ranked list of potential customers. Finally, the system presents the ranked list to the provider.

In a variation on this embodiment, the system selects a customer of the commodity from the ranked list based on the customer-traits and the set of preferred customer-traits.

DETAILED DESCRIPTION

Figure 1:
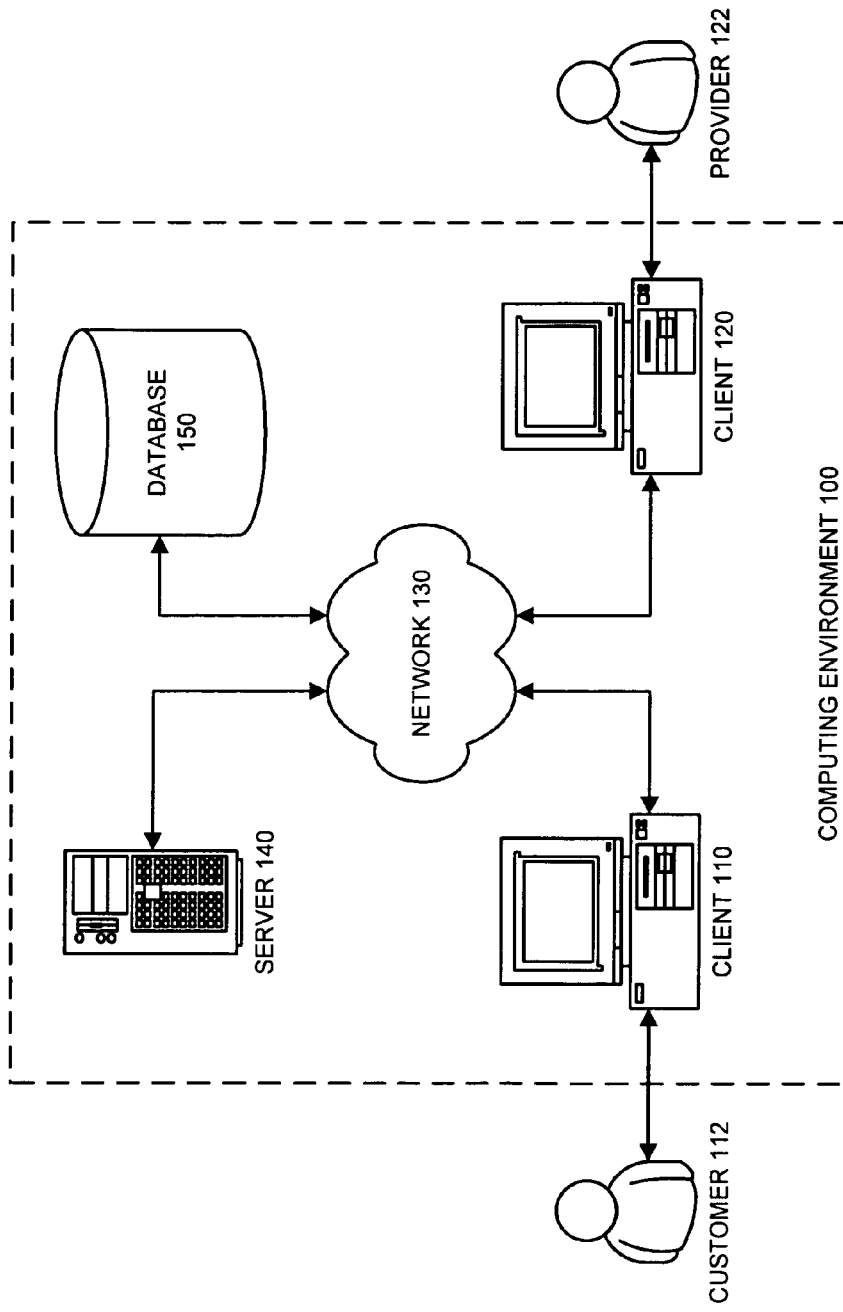
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

One embodiment of the present invention provides a peer-to-peer electronic commerce server that enables users to enter personal traits. For example, customers can enter personal traits that they require and/or prefer of a provider of a commodity. Similarly, providers can enter personal traits that they require and/or prefer of a customer. Note that personal traits can include any information that can be associated with a user. For example, personal traits can include: a location of the user, which can be a general location such as a county, or a very specific location, such as a neighborhood; a group affiliation; a hobby; and any other personal trait that can distinguish a user from a second user, or associate a user with a second user. Group affiliations can include any private or public group, such as users belonging to a specific church, users from a specific town, users who served in the Vietnam War, or any other definable group. Moreover, note that the state of being a customer or a provider is not an exclusive role—it is possible to be both a customer and a provider.

In one embodiment of the present invention, before including a group affiliation as a personal trait, a user authenticates with a group administrator who controls which users can affiliate with a group.

In one embodiment of the present invention, the peer-to-peer electronic commerce server can be the group administrator. In this embodiment, the group creator specifies the conditions that a user is required to meet to join the group. The peer-to-peer electronic commerce server then authenticates the user to ensure that the user meets the conditions that the group creator specified.

In one embodiment of the present invention, a commodity can include: a physical item, such as a car or a book; a piece of software, such as an operating system; a service, such as landscaping or babysitting; or information.

In one embodiment of the present invention, a customer can search for a provider of a commodity by searching for personal traits that the customer requires or prefers of the provider. Similarly, a provider can select a customer from a set of potential customers who have expressed interest in purchasing the commodity based on the personal traits that are associated with the potential customers. For example, suppose that a customer lives in town X and that the customer wants to purchase a used car. Furthermore, suppose that the customer only trusts providers who reside in town X, or who have attended university Y, the customer's alma mater. Using the peer-to-peer electronic commerce server, the customer can search for providers of cars who possess the personal traits of living in town X, or having attended university Y.

As a second example, suppose that a provider is selling a car, but the provider, empathizing with poor college students, only wishes to sell the car to a college student. Using the peer-to-peer electronic commerce server, the provider can specify that for a potential customer to be eligible to purchase the car the potential customer is required to be a college-student. The peer-to-peer electronic commerce server will not present the listing of the provider's car to any potential customers who have not identified themselves as college students. Now, suppose that although the provider wants to sell the car to a college student, the provider would prefer to sell the car to a college student who attends the provider's alma mater. The provider can specify being a student at the provider's alma mater as a preferred customer-trait and request that the peer-to-peer electronic commerce server sort the list of potential customers based on this preferred customer-trait.

In one embodiment of the present invention, the peer-to-peer electronic commerce server can complete a sales transaction on behalf of the provider according to conditions specified by the provider.

In one embodiment of the present invention, the peer-to-peer electronic commerce server can use the personal traits supplied by users for targeted advertising. Note that this embodiment does not require a third-party user to view the personal traits; an organization can configure the peer-to-peer electronic commerce server to perform the targeted advertising without user-intervention.

Note that the present invention is not restricted to commerce applications. Any peer-to-peer application can use the present invention to influence search-results. For example, an employer can use the present invention to pre-filter resumes of job-candidates who provided personal traits when registering for an online job-search service.

Computing Environment

FIG. 1 illustrates a computing environment 100 in accordance with an embodiment of the present invention. Computing environment 100 includes a number of computer systems. These computer systems can generally include any type of computer system based on a microprocessor, a mainframe computer, a digital signal processor, a portable computing device, a personal organizer, a device controller, or a computational engine within an appliance. More specifically, computing environment 100 includes client 110, client 120, network 130, server 140, and database 150.

Clients 110 and 120 can generally include any node on a network including computational capability and including a mechanism for communicating across the network.

Network 130 can generally include any type of wired or wireless communication channel capable of coupling together computing nodes. This includes, but is not limited to, a local area network, a wide area network, or a combination of networks. In one embodiment of the present invention, network 130 comprises the Internet.

Server 140 can generally include any computational node including a mechanism for servicing requests from a client for computational and/or data storage resources. In one embodiment of the present invention, server 140 can include a web-server, or a commodity-server, which facilitates commerce-transactions.

In one embodiment of the present invention, server 140 is configured to facilitate peer-to-peer electronic commerce.

Database 150 can generally include any type of system for storing data in non-volatile storage. This includes, but is not limited to, systems based upon magnetic, optical, and magneto-optical storage devices, as well as storage devices based on flash memory and/or battery-backed up memory.

Suppose that customer 112 wants to purchase a commodity. (Note that a commodity can include a physical item, a piece of software, or a service, such as landscaping.) To find an instance of the commodity to purchase, customer 112 accesses a web-site hosted by server 140 that facilitates peer-to-peer electronic commerce. Before searching for the commodity, customer 112 registers with the web-site. This involves customer 112 providing the web-site with a set of customer-traits which describe customer 112 (such as customer 112's hobbies or town of birth). At this point, customer 112 also provides the web-site with a set of desired provider-traits. Note that the desired provider-traits can include required provider-traits, which customer 112 requires of the providers of the commodity, and preferred provider-traits, which customer 112 desires of the providers, but does not require of the providers.

After registering with the web-site, customer 112 can search for the commodity from providers who have the desired provider-traits. Note that the web-site only shows customer 112 a given provider if customer 112 has the required customer-traits as requested by the given provider. Upon finding the commodity, the web-site presents customer 112 with a list of the providers of the commodity who have the required provider-traits. Note that the list can be sorted based on a score that server 140 calculates for each provider on the list and that is based on preferred provider-traits that customer 112 desires of the providers of the commodity. In calculating the score, server 140 can assign weighted values to preferred provider-traits to account for how much importance customer 112 gives to a specific preferred provider-trait.

In one embodiment of the present invention, suppose that provider 122 is selling a commodity via a web-site hosted by server 140 that facilitates peer-to-peer commerce. Prior to listing the commodity on the web-site, provider 122 registers with the web-site. This involves provider 122 sending provider-traits which describe provider 122 (such as provider 122's place of worship) to the web-site. At this point, provider 122 also sends to the web-site a list of desired customer-traits that provider 122 requires of a customer of the commodity. Note that the desired customer-traits can include both required customer-traits and preferred customer-traits.

After registering with the web-site, provider 122 lists the commodity on the web-site. Next, server 140 retrieves customer-traits from potential customers of the commodity. Server 140 then ranks the potential customers by comparing the customer-traits with the preferred customer-traits that provider 122 desires of the customer of the commodity. Note that the potential customers can be ranked based on a score that server 140 calculates for each potential customer. This score is based on preferred customer-traits that provider 122 desires of the customers of the commodity.

In calculating the score, server 140 can assign weighted values to preferred customer-traits to account for how much importance provider 122 gives to a specific preferred customer-trait. Note that the preferred customer-trait is a trait that provider 122 desires of the potential customers, but does not require of the potential customers. The next time provider 122 accesses the web-site, the web-site presents provider 122 with a ranked list of potential customers. Note that server 140 is not required to filter the potential customers of the commodity because server 140 filters the providers of the commodity before presenting the list of providers to the potential customers. Thus, the filter process has already occurred prior to a customer indicating interest in purchasing the commodity from provider 122.

In one embodiment of the present invention, provider 122 specifies conditions required to complete a transaction with a potential customer, including the desired customer-traits. In this embodiment, server 140 can complete the transaction with a customer from the ranked list of potential customers on behalf of provider 122 without provider 122 explicitly selecting a customer from the ranked list of potential customers.

In one embodiment of the present invention, customer 112 can avoid registering with the web-site. In this embodiment, customer 112 can only view commodities offered by providers who do not specify any required customer-traits.

In one embodiment of the present invention, customer 112 can specify desired provider-traits without registering with the web-site. In this embodiment, the desired provider-traits are only used for the current session and are not saved by the web-site for future use.

In one embodiment of the present invention, customer 112 can specify customer-traits without registering with the web-site. In this embodiment of the present invention, the customer-traits are only valid for the current sessions and are not saved by the web-site for future use.

In one embodiment of the present invention, provider 122 can avoid registering with the web-site. In this embodiment, provider 122 can search a commodities-wanted section of the web-site for potential customers who want to purchase commodities that provider 122 can provide. Note that the commodities-wanted section lists commodities that customer 112 and other customers desire and have specified as such on the web-site. Furthermore, note that without registering with the web-site, provider 122 is limited to listings on the commodities-wanted section posted by customers who have not specified any required provider-traits.

In one embodiment of the present invention, server 140 is not restricted to a server that facilitates electronic commerce, but can facilitate any peer-to-peer service (such as a resume service, a dating service, or a donation service). For example, suppose that customer 112 is seeking a job and provider 122 is an employer. Using server 140, customer 112 can pre-filter employers so that server 140 only presents job descriptions for employers who provide day-care. Similarly, provider 122 can pre-filter potential job-applicants so that server 140 only presents resumes of potential job-applicants who attended provider 122's alma mater.

Registering a User

Figure 2:
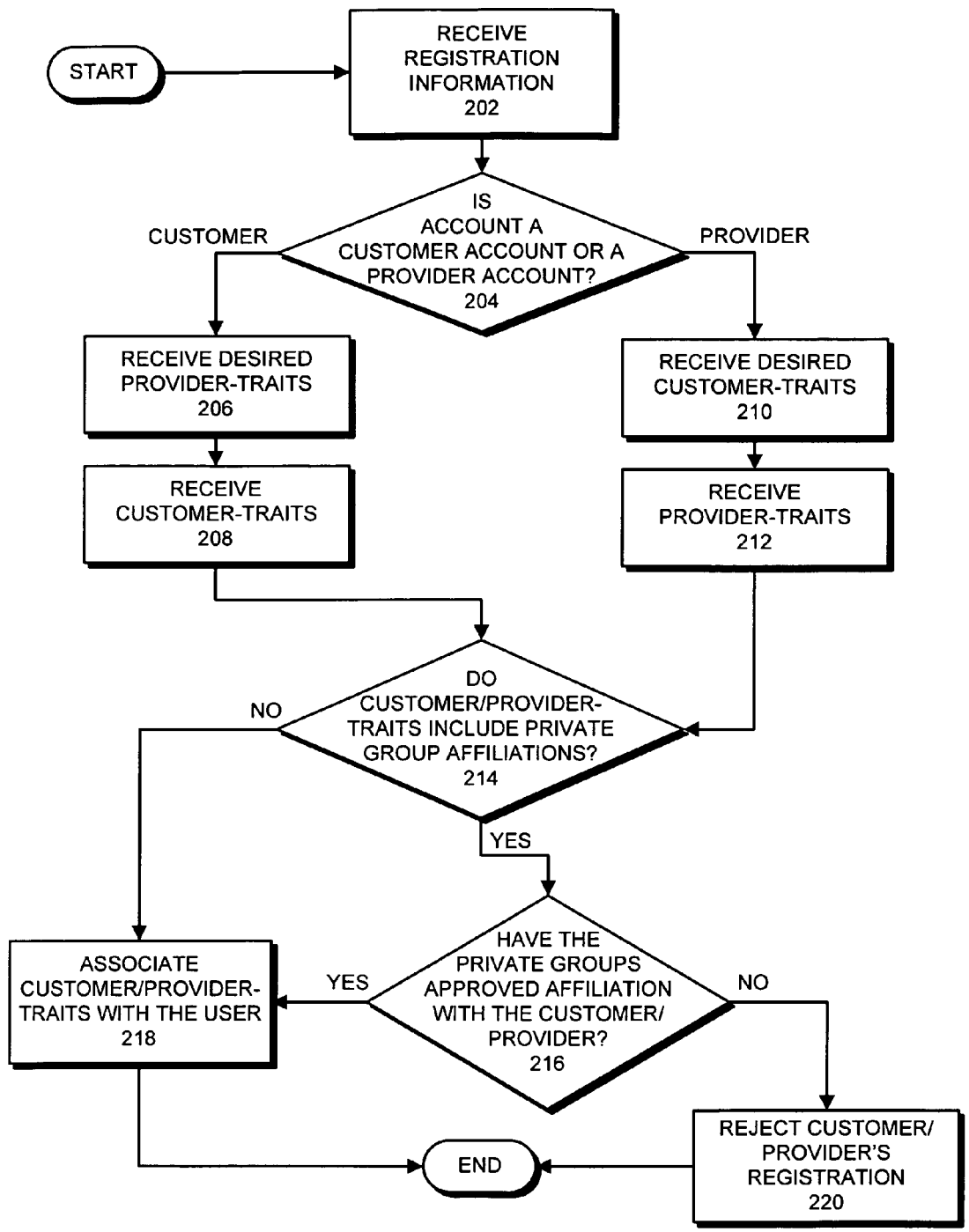
FIG. 2 presents a flow chart illustrating the process of registering a user in accordance with an embodiment of the present invention.

FIG. 2 presents a flow chart illustrating the process of registering a user in accordance with an embodiment of the present invention. The process begins when server 140 receives registration information from a user, such as customer 112 or provider 122 (step 202). Server 140 then determines if the account is for customer 112 or provider 122 (step 204). If the account is for customer 112, server 140 receives desired provider-traits from customer 112 (step 206). Then, server 140 receives customer-traits from customer 112 (step 208). If the account is for provider 122, server 140 receives desired customer-traits from provider 122 (step 210). Then, server 140 receives provider-traits from provider 122 (step 212).

In one embodiment of the present invention, desired provider-traits can include required provider-traits, which customer 112 requires of a provider, and preferred provider-traits, which customer 112 desires of the provider, but does not require.

In one embodiment of the present invention, desired customer-traits can include required customer-traits, which provider 122 requires of a customer, and preferred customer-traits, which provider 122 desires of the customer, but does not require.

In one embodiment of the present invention, provider-traits, desired provider-traits (both required and preferred), customer-traits, and desired customer-traits (both required and preferred) can include: a location of provider 122 or customer 112; a group affiliation of provider 122 or customer 112; a hobby of provider 122 or customer 112; a provider/customer-feedback level for provider 122 or customer 112; a degree of association with provider 122 or customer 112; a number of prior interactions with provider 122 or customer 112; and any other trait that can describe provider 122 or customer 112.

In one embodiment of the present invention, the location of provider 122 or customer 112 can be as general or as specific as provider 122 or customer 112 desire.

In one embodiment of the present invention, the group affiliation can include any public or private group created by a user. This can include groups based on: place of worship, town of birth, town of residence, university attended, distinguishing physical-characteristics, and any other trait that can define a group of customers/providers. Note that server 140 or the creator of the private group authenticates customer 112 or provider 122 before customer 112 or provider 122 can join the private group. Furthermore, customer 112 and provider 122 can create their own public or private groups. If customer 112 or provider 122 creates a private group, then customer 112 or provider 122 can decide who is eligible to join the private group.

In one embodiment of the present invention, provider-traits, desired provider-traits (both required and preferred), customer-traits, and desired customer-traits (both required and preferred) can include personal-traits that server 140 determines based on customer 112 or provider 122's use of server 140 and information that customer 112 or provider 122 sends to server 140. For example, these personal-traits can include: customer 112 or provider 122's degree of association with a second user; customer 112's buyer-rating; provider 122's seller-rating; the number of transactions between customer 112 and provider 122; and any other personal-traits that server 140 can determine and associate with customer 112 or provider 122. Note that by determining the degree of association of a second user, server 140 enables customer 112 to select a provider to purchase a commodity from based on, for example, whether an associate of customer 112 knows or trusts the provider. Furthermore, by determining the degree of association of a second user, server 140 enables provider 122 to sell a commodity to a customer based on whether an associate of provider 122 knows or trusts the customer.

Next, server 140 determines if the customer-traits or the provider-traits include private group affiliations (step 214). If not, server 140 associates the customer-traits or the provider-traits with customer 112 or provider 122 respectively (step 218). If so, server 140 determines if a group administrator has approved customer 112 or provider 122 joining the specified private groups (step 216). If so, server 140 associates the customer-traits or provider-traits with customer 112 or provider 122 respectively (step 218). If not, server 140 rejects customer 112 or provider 122's registration (step 220).

In one embodiment of the present invention, customer 112 can create a provider account.

In one embodiment of the present invention, customer 112 can create an account that is both a provider account and a customer account.

In one embodiment of the present invention, server 140 stores customer 112's registration information, customer-traits, and desired provider traits on database 150.

Determining a List of Providers

Figure 3:
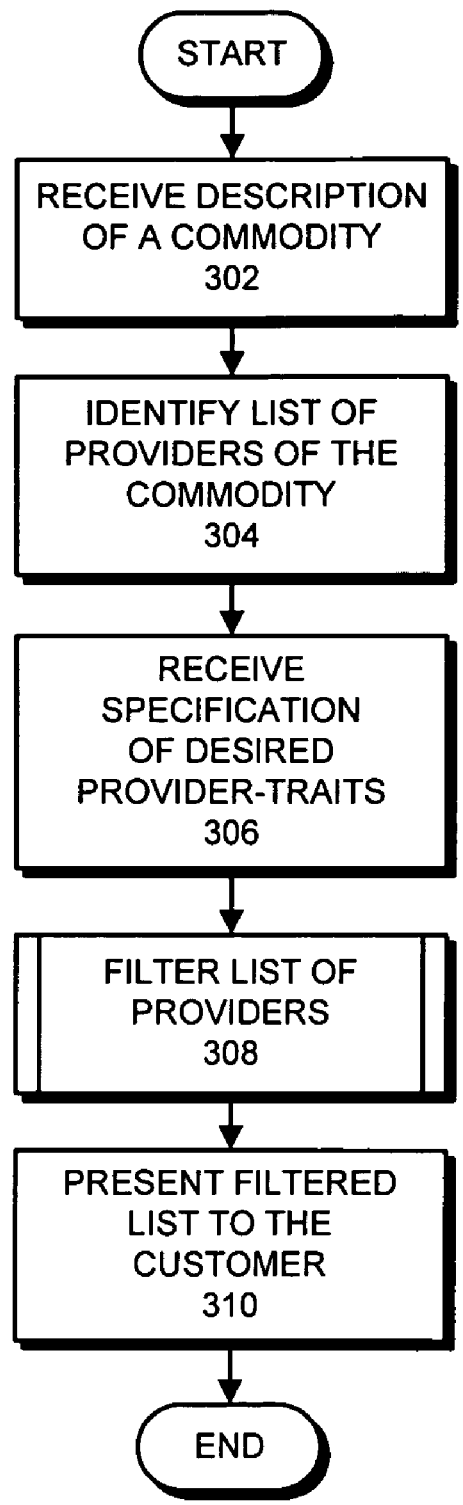
FIG. 3 presents a flow chart illustrating the process of determining a list of providers of a commodity in accordance with an embodiment of the present invention.

FIG. 3 presents a flow chart illustrating the process of determining a list of providers of a commodity in accordance with an embodiment of the present invention. The process begins when server 140 receives a description of a commodity (step 302). This can involve customer 112 providing a search-term specifying the commodity, or clicking on a link associated with the commodity. Next, server 140 identifies a list of providers of the commodity (step 304). Then, server 140 receives a specification of a set of desired provider-traits (306). Note that if customer 112 provided the specification of the set of desired provider-traits when customer 112 registered, then server 140 can retrieve the specification of the set of desired provider-traits from database 150. Furthermore, note that customer 112 can amend the desired provider-traits and the customer-traits.

Next, server 140 uses the desired provider-traits to filter the list of providers of the commodity (step 308). Note that this is a multi-step process, which is described in more detail below with reference to FIG. 4.

After filtering the list of providers, server 140 presents the filtered list to customer 112 (step 310).

In one embodiment of the present invention, the filtered list includes for each provider the specification of the provider-traits that match customer 112's desired provider-traits. In this embodiment, the filtered list does not include any additional provider-traits that were not included in customer 112's specification of desired provider-traits.

In one embodiment of the present invention, server 140 stores the filtered list of providers on database 150. This enables server 140 to identify possible providers of a commodity without re-comparing provider-traits with desired provider-traits during subsequent commodity searches. Note that if customer 112 changes the desired provider-traits, or if a provider changes the provider-traits associated with the provider, server 140 re-compares the provider-traits to the desired provider-traits. This embodiment also facilitates identifying possible customers for provider 122 without re-comparing customer-traits with desired customer-traits. Note that if provider 122 changes the desired customer-traits, or if a customer changes the customer-traits associated with the customer, server 140 re-compares the customer-traits to the desired customer-traits. Furthermore, note that this embodiment does not facilitate identifying new providers or new potential customers.

In one embodiment of the present invention, server 140 stores a list of providers on database 150 that server 140 has previously identified as lacking the desired provider-traits. This enables server 140 to identify future commodity-searches providers who lack the desired provider-traits without re-comparing provider-traits with desired provider-traits. Note that if customer 112 changes the desired provider-traits, or if a provider changes the provider-traits associated with the provider, server 140 re-compares the provider-traits with the desired provider-traits.

This embodiment also facilitates identifying customers who lack desired customer-traits without re-comparing customer-traits with desired customer-traits. Note that if provider 122 changes the desired customer-traits, or if a customer changes the customer-traits associated with the customer, server 140 re-compares the customer-traits with the desired customer-traits. Furthermore, note that this embodiment does not facilitate identifying new providers or new potential customers.

Filtering a List of Providers

Figure 4:
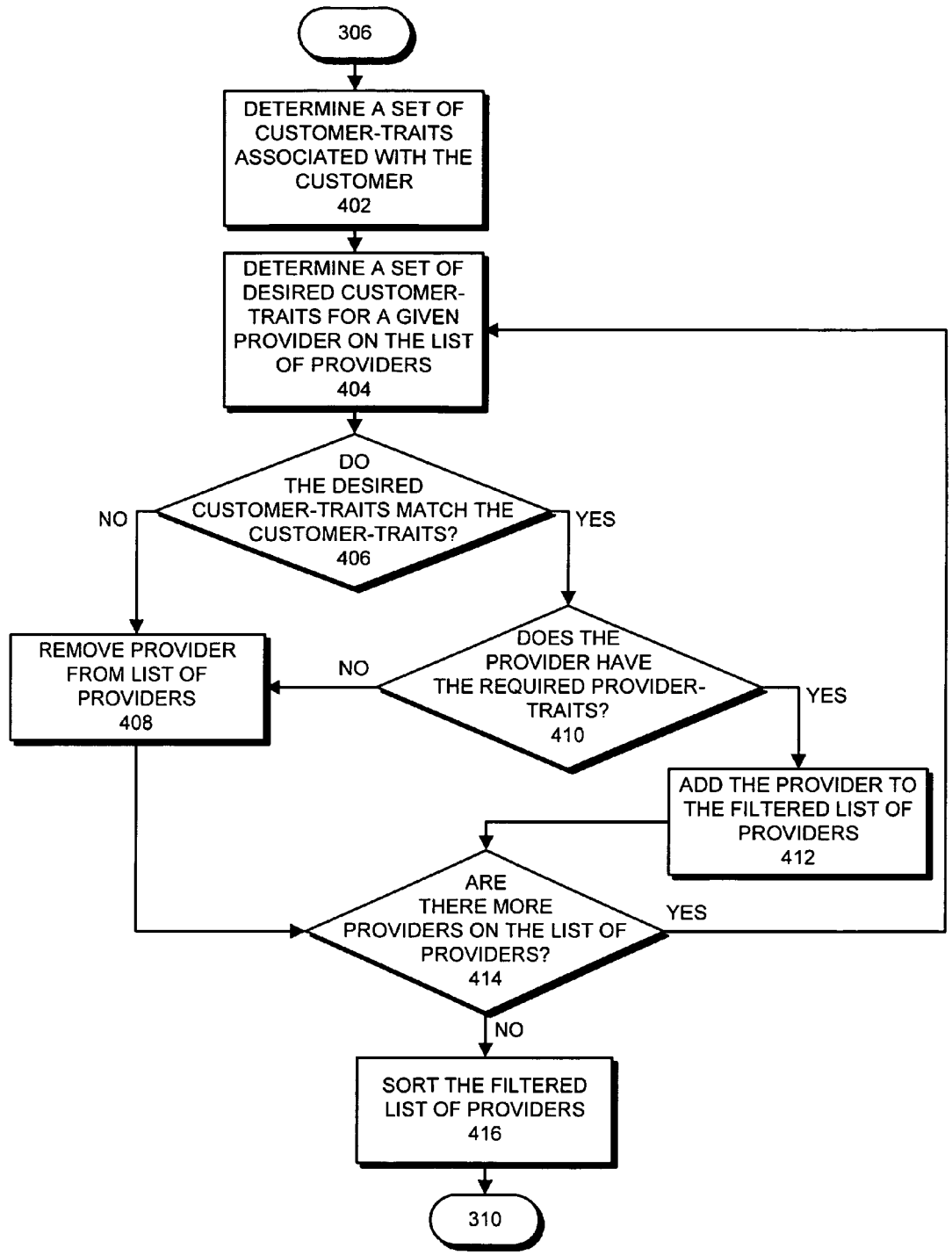
FIG. 4 presents a flow chart illustrating the process of filtering a list of providers of a commodity in accordance with an embodiment of the present invention.

FIG. 4 presents a flow chart illustrating the process of filtering a list of providers of a commodity in accordance with an embodiment of the present invention. The process begins when server 140 determines a set of customer-traits associated with customer 112 (step 402). Note that this may involve receiving customer-traits from customer 112.

In one embodiment of the present invention, determining the set of customer-traits can involve retrieving the set of customer-traits from database 150.

Next, server 140 determines a set of desired customer-traits for a given provider on the list of providers (step 404). Note that this can involve retrieving the set of desired customer-traits from database 150. Server 140 then determines if the customer-traits match the desired customer-traits (step 406). Note that this can involve determining if the customer-traits match both the required customer-traits and the preferred customer-traits.

In one embodiment of the present invention, determining if the customer-traits match the desired customer-traits is limited to determining if customer-traits match the required customer-traits. In this embodiment, server 140 does not determine if the customer-traits match the preferred customer-traits.

If the customer-traits match the desired customer-traits, server 140 determines if the given provider has the required provider-traits (step 410). If so, server 140 adds the provider to the filtered list of providers (step 412). If the customer traits do not match the desired customer-traits, or if the given provider does not have the required provider-traits, server 140 removes the given provider from the list of providers (step 408). After removing the given provider from the list of providers, or after adding the given provider to the filtered list of providers, server 140 determines if there are more providers on the list of providers (step 414). If so, server 140 proceeds to step 404. If not, server 140 sorts the filtered list of providers (step 416).

Note that sorting the filtered list of providers may involve comparing the preferred provider-traits for a given provider on the filtered list to the preferred provider-traits of the remaining providers specified by the filtered list. Furthermore, note that sorting the filtered list can involve server 140 calculating a score for each provider on the filtered list based on the preferred provider-traits associated with each provider on the filtered list. In calculating the score, server 140 can assign different weighted values to the different preferred provider-traits to account for the level of importance customer 112 places on each preferred provider-trait. Server 140 then proceeds to step 310.

Selecting a Customer of a Commodity

Figure 5:
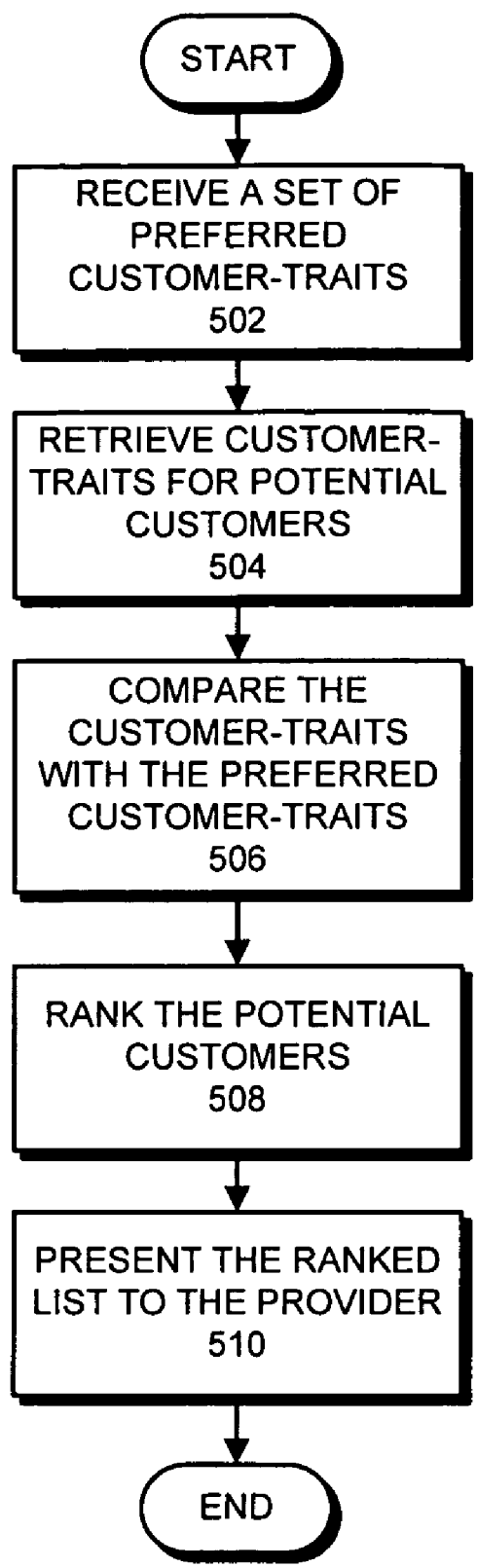
FIG. 5 presents a flow chart illustrating the process of selecting a customer of a commodity in accordance with an embodiment of the present invention.

FIG. 5 presents a flow chart illustrating the process of selecting a customer of a commodity in accordance with an embodiment of the present invention. Note that this process occurs after server 140 has presented a filtered list of providers to customer 112. Because creating the filtered list involves comparing customer traits to required customer-traits, using required customer-traits to select a customer of a commodity is unnecessary. Therefore, this process is described herein with reference to FIG. 5 in terms of preferred customer-traits. However, note that this process can involve both preferred customer-traits and required customer-traits.

The process begins when server 140 receives a set of preferred customer-traits from provider 122 (step 502). Server 140 then retrieves customer-traits for potential customers from database 150 (step 504). Note that potential customers are customers who have indicated a willingness to purchase a commodity from provider 122. Furthermore, potential customers are customers who have required customer-traits as specified by provider 122. Server 140 then compares the customer-traits to the preferred customer-traits (step 506). Using the result of this comparison, server 140 ranks the potential customers to obtain a ranked list of potential customers (step 508). Server 140 then presents the ranked list to provider 122 (step 510).

In one embodiment of the present invention, ranking the potential customers can involve server 140 calculating a weighted score based on the importance the provider 122 places on each preferred customer-trait. Server 140 can then use the weighted score to rank the potential customers.

In one embodiment of the present invention, server 140 selects a customer from the list of potential customers to purchase the commodity. In this embodiment, server 140 may or may not present the ranked list to provider 122. Note that server 140 can select the customer based on the ranked list, or based on any other criteria specified by provider 122.

In one embodiment of the present invention, provider 122 can specify a different purchase price based on the preferred customer-traits associated with the potential customers. This embodiment enables provider 122 to give discounts to specific customers, such as repeat customers or students.

In one embodiment of the present invention, the ranked list includes for each customer the customer-traits that match provider 122's desired customer-traits. In this embodiment, the ranked list does not include any additional customer-traits that were not included in provider 122's specification of desired customer-traits.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for selecting a customer of a commodity, the method comprising:
   receiving a set of traits for a customer;
   receiving a customer's description of the commodity;
   identifying, by a computer, a provider of the commodity based on the description of the commodity;
   receiving the customer's specification of a set of provider traits wherein the set of provider traits includes a set of required provider traits and a set of preferred provider traits;
   receiving a set of traits for the provider;
   determining, by the computer, that the set of traits for the provider satisfy the set of required provider traits specified by the customer;
   receiving the provider's specification of a set of customer-traits, wherein the set of customer traits includes a set of required customer traits and a set of preferred customer traits;
   determining, by the computer, that the customer is a potential customer for the provider based on the set of traits for the customer satisfying the set of required customer traits specified by the provider;
   determining, by the computer, a score for the customer, wherein the score is based on the set of traits for the customer satisfying the set of preferred customer traits specified by the provider;
   ranking the customer, based on the determined score, within a ranked list of customers for the commodity offered by the provider; and
   presenting the ranked list of customers to the provider.

2. The method of claim 1, wherein the commodity can include:
   a physical item;
   a piece of software; and
   a service.

3. The method of claim 1, wherein the provider-traits comprise one or more of:
   a group affiliation of the given provider;
   a hobby of the given provider; and
   a number of prior interactions with the customer.

4. The method of claim 1, further comprising
   adding the provider to a filtered list of providers of the commodity for the customer, wherein the adding is based on the set of traits for the provider satisfying the set of required provider traits specified by the customer.

5. The method of claim 4, further comprising
   determining a ranked list of providers by ranking each provider in the filtered list based on the set of traits for a provider matching the set of preferred provider traits.

6. The method of claim 5, further comprising presenting the ranked list of providers to the customer.

7. The method of claim 1, further comprising determining a price to be paid by the customer for the commodity, wherein the determining is based on the set of preferred customer traits specified by the provider that are satisfied by the customer.

8. A non-transitory computer-readable storage medium storing instructions that when executed by a computer cause the computer to perform a method for selecting a customer of a commodity, the method comprising:
   receiving a set of traits for a customer;

receiving a customer's description of the commodity;

identifying a provider of the commodity based on the description of the commodity;

receiving the customer's specification of a set of provider traits wherein the set of provider traits includes a set of required provider traits and a set of preferred provider traits;

receiving a set of traits for the provider;

determining that set of traits for the provider satisfying the set of required provider traits specified by the customer;

receiving the provider's specification of a set of customer-traits, wherein the set of customer traits includes a set of required customer traits and a set of preferred customer traits;

determining that the customer is a potential customer for the provider based on the set of traits for the customer satisfying the set of required customer traits specified by the provider;

determining a score for the customer, wherein the score is based on the set of traits for the customer satisfying the set of preferred customer traits specified by the provider;

ranking the customer, based on the determined score, within a ranked list of customers for the commodity offered by the provider; and presenting the ranked list of customers to the provider.

9. The computer-readable storage medium of claim 8, wherein the commodity can include:
   a physical item;
   a piece of software; and
   a service.

10. The computer-readable storage medium of claim 8, wherein the provider-traits comprise one or more of:
    a group affiliation of the given provider;
    a hobby of the given provider; and
    a number of prior interactions with the customer.

11. The computer-readable storage medium of claim 8, further comprising:
    adding the provider to a filtered list of providers of the commodity for the customer, wherein the adding is based on the set of traits for the provider satisfying the set of required provider traits specified by the customer.

12. The computer-readable storage medium of claim 11, further comprising:
    determining a ranked list of providers by ranking each provider in the filtered list based on the set of traits for a provider matching the set of preferred provider traits.

13. The computer-readable storage medium of claim 12, further comprising presenting the ranked list of providers to the customer.

14. The computer readable storage medium of claim 8, further comprising determining a price to be paid by the customer for the commodity, wherein the determining is based on the set of preferred customer traits specified by the provider that are satisfied by the customer.

15. An apparatus for selecting a customer of a commodity, comprising:
    a processor;
    a memory;
    a receiving mechanism configured to receive a set of traits for a customer; the receiving mechanism further configured to receive a customer's description of the commodity;
    an identification mechanism configured to identify a provider of the commodity based on the description of the commodity;
    the receiving mechanism further configured to receive the customer's specification of a set of provider traits wherein the set of provider traits includes a set of required provider traits and a set of preferred provider traits;
    the receiving mechanism further configured to receive a set of traits for the provider;
    a determination mechanism configured to determine that the set of traits for the provider satisfy the set of required provider traits specified by the customer;
    the receiving mechanism further configured to receive the provider's specification of a set of customer-traits, wherein the set of customer traits includes a set of required customer traits and a set of preferred customer traits;
    a determination mechanism configured to determine that the customer is a potential customer for the provider based on the set of traits for the customer satisfying the set of required customer traits specified by the provider;
    a scoring mechanism configured to determine a score for the customer, wherein the score is based on the set of traits for the customer satisfying the set of preferred customer traits specified by the provider;
    a ranking mechanism configured to rank the customer, based on the determined score, within a ranked list of customers for the commodity offered by the provider; and
    a presenting mechanism configured to present the ranked list of customers to the provider.

16. The apparatus of claim 15, further comprising:
    an adding mechanism configured to add the provider to a filtered list of providers of the commodity for the customer, wherein the adding is based on the set of traits for the provider satisfying the set of required provider traits specified by the customer.

17. The apparatus of claim 16, further comprising:
    the ranking mechanism further configured to determine a ranked list of providers by ranking each provider in the filtered list based on the set of traits for the provider matching the set of preferred provider traits.

18. The apparatus of claim 17, further comprising:
    the presenting mechanism further configured to present the ranked list of providers to the customer.

19. The apparatus of claim 15, further comprising:
    the determination mechanism further configured to determine a price to be paid by the customer for the commodity, wherein the determining is based on the set of preferred customer traits specified by the provider that are satisfied by the customer.

* * * * *